United States Patent Office 2,955,917
Patented Oct. 11, 1960

2,955,917

PROCESS AND APPARATUS FOR THE MANUFACTURE OF NITRIC ACID AT ELEVATED PRESSURES WITH FULL POWER RECOVERY

Edward S. Roberts, 874 Woodward Ave., Ridgewood, N.Y., and Michael J. Kalous, Toronto, Ontario, Canada. (1880 Delaware St., Niagara Falls, Ontario, Canada)

Filed May 13, 1958, Ser. No. 734,960

7 Claims. (Cl. 23—162)

In the usual operation of a so-called high pressure nitric acid plant, air is compressed to a pressure of about 6 to 8 atmospheres absolute. The pressure from this air maintains the whole process under pressure. The compressed air is mixed with ammonia vapor and burned in the presence of platinum gauze. This produces NO with a large evolution of heat. The gas is then cooled and at lower temperatures further oxygen reacts with the NO to form $NO_2$. $NO_2$ dimerizes to form $N_2O_4$ and this is absorbed in water to form $HNO_3$. In carrying out this process considerable power is required for compressing the air and maintaining the whole system under pressure.

Many attempts have been made to recover power from the system sufficient to operate the air compressors. Usually this is attempted by superheating the tail gases from the operation with heat generated by oxidizing the ammonia, and then passing the hot tail gases into an expansion turbine. Part of the power can be recovered in this manner, but the recovery is insufficient to operate the compressors to maintain the necessary pressure.

It is further to be noted that with this arrangement where the primary source of power for the air compressors is derived from hot tail gases it will be necessary to provide an independent prime mover for start-up purposes.

We have devised a system in which all of the power necessary for operating the nitric acid plant under full pressure is obtained by salvaging and properly utilizing the heat generated in the operation of the plant. As a result no additional power is needed except for starting up.

To accomplish this result the air to be burned with the ammonia is compressed in two or more stages of adiabatic compression, and power for driving these compressors is supplied by a gas turbine and a steam turbine. The steam turbine is driven by steam generated and superheated with the heat of combustion of the ammonia and air, and the gas turbine is operated by preheating the tail gases of the system (preferably in two or more stages) with heat resulting from the adiabatic compression of the air, after which the tail gases are given a final heating by the burner gases resulting from the combustion of the ammonia and air after the latter have passed through the steam boiler. When we refer to adiabatic compression we mean that a minimum amount of heat is withdrawn from the compressed air during compression in each stage, though heat is withdrawn from the hot air leaving the first stage before it enters the second stage of compression.

By having the tail gases preheated by the heat of compression before they are finally heated by the burner gases we are able to get the tail gases to a high enough temperature so that they can operate efficiently in a gas turbine.

Ordinarily there is one point in a system of the general type here discussed where difficulty occurs. The burner gases always contain some water vapor and as they are cooled down, the point is eventually reached (and the exact temperature will depend upon the pressure of the system) where the water vapor starts to condense (the dew point) and a formation of dilute nitric acid results. This dilute nitric acid causes very bad corrosion in ordinary apparatus.

In our process (as already stated) after the burner gases have already given up much of their heat for generating and superheating steam we use residual heat from the burner gases for heating the tail gases for use in a gas turbine. If the tail gases were not preheated before taking heat from the burner gases, there would be very serious danger that the temperature in the heat exchanger in which the tail gases withdraw heat from the burner gases would drop below the dew point of the burner gas, and cause corrosion in the heat exchanger. By having the tail gases preheated we can prevent the burner gases from dropping below the dew point in the exchanger.

At last, when the critical dew point is reached and as a final step in the utilization of the heat of the burner gases, they are passed through what we call "an economizer" in indirect countercurrent heat exchange with flowing water. This is a very efficient form of heat exchange so that the corrosion danger zone is localized and the area of the surfaces can be relatively small. For this reason we can economically make this economizer of a highly corrosive resistant metal such as titanium or special high chromium stainless steel and thereby meet the corrosion problem with a minimum of expense. At the same time the residue of burner heat extracted in this way is utilized, because the water to which it gives up its heat is used as boiler feed water and this reduces the amount of heat to be taken out of the burner gases for generating steam at the boiler.

From the economizer, the burner gases pass through a zone for oxidizing NO to $NO_2$, a cooler condenser and an absorption system resulting in the production of nitric acid in the usual manner. It will be noted, however, that in our process the gases and condensate, before they enter the cooler condenser, are cooled down low enough so that they will have little corrosive action on ordinary stainless steel.

After passing through the final absorption system from which the acid is withdrawn, the tail gases are passed through the heat exchangers already described, to be preheated by heat developed in the compressors and then are heated by the burner gases and used to develop power.

While we have said that these processes are usually operated at from about 6 to 8 atmospheres absolute we have found that it is satisfactory if the compressors raise the pressure on the air going into the system to between 85 p.s.i.a. and 130 p.s.i.a. In designing the equipment it is desirable to so proportion the various stages of compression that the compression ratio in the last stage is sufficient so that the air discharged from this last stage has a temperature of from 430° F. to 490° F. Within this range the air from the second stage of compression can be used for direct mixing with the ammonia vapors. However, even if the air from the second stage of compression is at a somewhat lower temperature than this there is enough heat margin in our system so that some of the heat of the burner gases can be used to raise the temperature of the primary air.

Our invention can readily be understood from the following illustrative examples taken in connection with the drawings in which.

Figure 1:
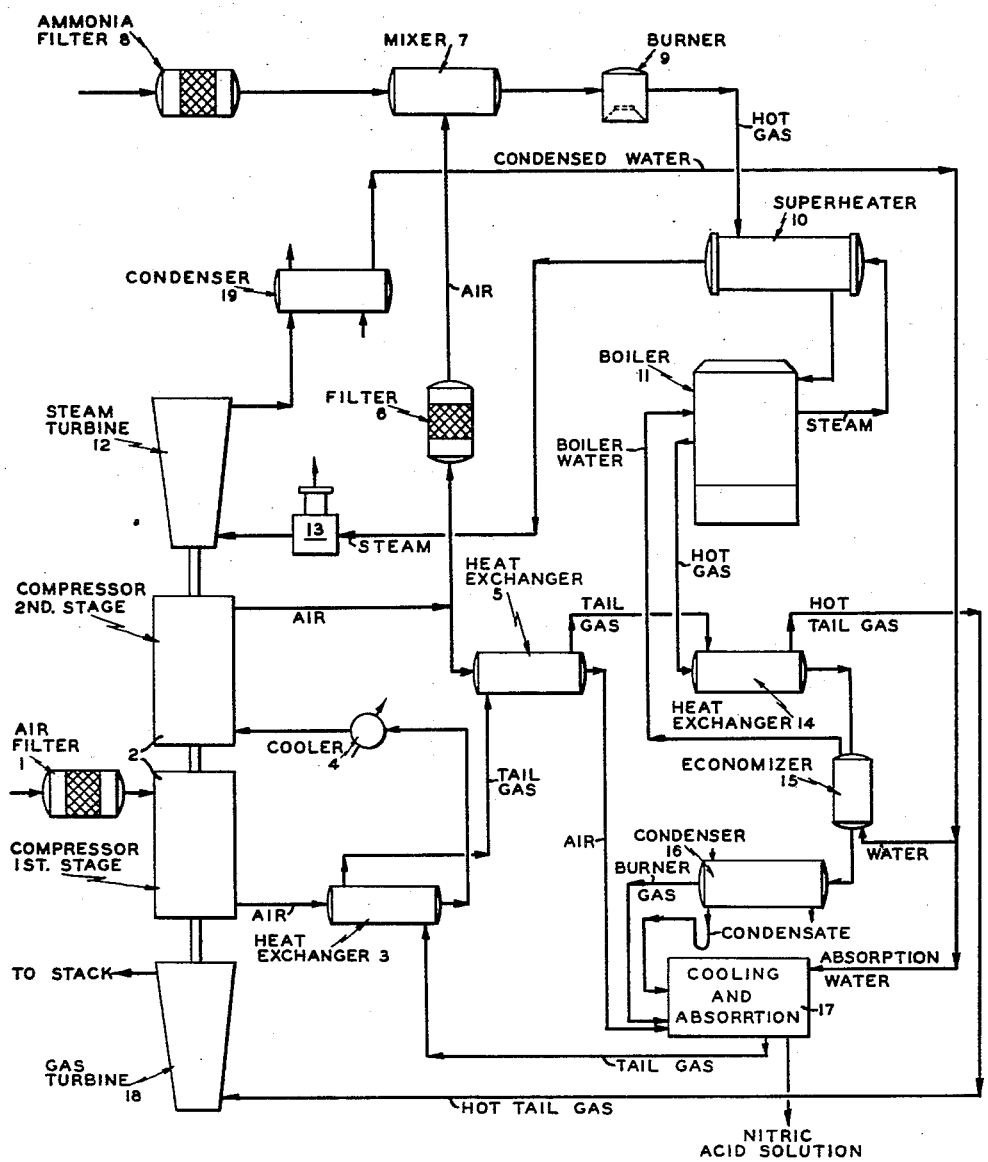
Fig. 1 is a flow sheet of our preferred method of operation.

In the example of Fig. 1 we illustrate the operation of a plant to produce 200,000 lbs. per day of $HNO_3$ in a water solution of 57 to 60% by weight of $HNO_3$. To produce this amount of nitric acid demands 141 lb.

mols per hour of NH₃ gas and 1487 lb. mols of total air per hour. As previously stated it is important to operate the whole system at a pressure of from 6 to 8 atmospheres absolute and in this example the air is compressed to 118 p.s.i.a.

To obtain this pressure the air is compressed in a multi-stage compressor which may have two or more stages, and it is an important feature of our invention that this compression is adiabatic in each stage, that is, none of the heat of compression is removed during the compression except such small amounts as are lost by radiation or convection. By using this type of compression the amount of power required is increased slightly but all of the heat of compression from each stage remains in the compressed air and this is utilized in our process for transmitting heat to the waste gases that are used for supplying power.

In the flow sheet the air passes through the air filter 1, and then enters the first stage of a compressor 2. For the purpose of illustration we show a two-stage compressor, but it is understood that additional stages may be employed.

In our example we ultimately compress the air to 118 p.s.i.a. and this pressure may be divided between the two-stages as most convenient. In our example the air is compressed in the first stage to 29.4 p.s.i.a. Our calculations are based upon the assumption that the air entering the filter 1 is at a temperature of about 86° F. In such case the air issuing from the first stage of compressor 2 will be at a temperature of about 250° F. This air passes through the shell of a first-stage tail gas preheater 3. This preheater consists of a shell and tube heat exchanger with stainless steel tubes for the tail gases and a carbon steel shell through which the hot air passes. In the heat exchanger heat is transferred from the adiabatically compressed hot air to tail gas coming from the absorption system to be later described. This gas will also be at a temperature of about 86° F. and in the heat exchanger it is heated to about 210° F. With this heat exchange the air leaving the first tail gas preheater will have a temperature of about 143° F. and this is then cooled in the interstage cooler 4 to a temperature of 86° F. and any condensed moisture is removed. The cool air under pressure of about 29.0 p.s.i.a. enters the second stage of compressor 2 where it is compressed to 118 p.s.i.a. Since this second stage of compression is also so conducted that a minimum of heat is removed from the air during compression, the air issuing from the second stage of compression will be at a temperature of about 445° F. and its pressure of 118 p.s.i.a. will determine the pressure for the whole system.

The adiabatically heated air from the second stage of compression is split into two streams. About 1235 lb. mols per hour of the air is considered as primary air and is mixed with the ammonia. The balance of the air from the second stage of compression passes through a second tail gas preheater 5 where it heats the tail gas leaving the first tail gas preheater from 210° F. to about 250° F. and is itself cooled to about 228° F. This air is later used in the absorption system as will be explained below.

The primary air passes through the pressure air filter 6 and meets a stream of 141 lb. mols per hour of NH₃ gas which has passed through the ammonia gas filter 8 at 140° F. and then is mixed with the air in the ammonia-air mixer 7. The gas mixture which leaves the ammonia-air mixer at about 410° F. enters the burner 9. In the burner the ammonia is oxidized by reaction with oxygen of the air in contact with a platinum gauze catalyst as is standard in this reaction.

The burner gases leaving the burner 9 at about 1610° F. pass directly into the steam superheater 10. This superheater consists preferably of a pressure resistant chamber with a heat insulating lining which is equipped inside with pipe coils preferably made of stabilized austenitic stainless steel (18 and 8) through which steam is passed for superheating as will be explained below.

The burner gases leaving the superheater at about 1435° F. pass into the boiler 11. The boiler is constructed as a shell and tube fire tube boiler and the burner gases pass through the tubes. The water in the shell outside the tubes boils at a pressure of 405 p.s.i.a. and the steam from the boiler is sent out through the coils of the superheater 10. The surface area of these coils is sufficient to raise the temperature of about 595 lb. mols per hour of steam at a pressure of 405 p.s.i.a. from its saturation temperature of 445° F. to a superheat of 755° F. while cooling the burner gases from 1610° F. down to 1435° F. The steam passage area should be so designed as to give a heat transfer coefficient on the steam side (inside the coils) sufficiently high relative to the heat transfer coefficient on the outside of the coils so that the metal wall temperature of the coils will be below 1350° F. at which the metal begins to suffer from scaling and from embrittlement by the formation of an iron-chromium compound, the so-called "sigma" phase. Within the limits specified the arrangement of heat transfer can be in any desired form such as counterflow, coflow or cross flow. Actually we have found that it is possible to get the desired superheat in the steam while maintaining the wall temperature of the coils at a maximum of not over 1200° F. which is well below the temperature at which either scaling or embrittlement occurs.

Steam from the superheater 10 is sent to the steam turbine 12. Actually we find that ordinarily somewhat more steam will be produced than is necessary for operating this turbine and any excess is drawn off through the steam pressure controller 13 and used elsewhere.

In the boiler 11 the water in the boiler is maintained at a temperature of about 445° F. which is well above the dew point of the burner gases at the existing pressure (about 228° F.) so that no condensation of moisture will occur at this point with the formation of corrosive dilute nitric acid. For this reason the boilers may be constructed entirely of carbon steel. However, provision should be made so that on start-up the boiler may be filled with water well above 250° F. so that condensation at this point will not occur. Sufficient heat transfer surface is preferably built into the boiler so that the burner gases will leave the boiler at something over 480° F.

The burner gases having thus served to generate and superheat steam for the steam turbine 12, will leave the boiler 11 at a considerably reduced temperature but still containing large amounts of heat. The temperature will be low enough to favor further oxidation of NO to NO₂ and this will serve to raise the temperature of these gases. In order to insure this reaction taking place, it is advisable so to construct the connections through which the burner gases pass that their movement will be relatively slow. As is well known, this can be done by using pipes of large cross section, or actually, large chambers which may contain filters for the recovery of platinum dust may be provided for the oxidation reaction to occur. Such a chamber is indicated at 21 in Fig. 2. In any event, the amount of heat generated by this further oxidation is appreciable and adds to the efficiency of our process and gives us a substantial margin so as to insure our having enough heat to accomplish the desired results. Thus, the tail gases after leaving the boiler 11 are passed through a tail gas heater 14 where the burner gases from the boiler pass in indirect heat transfer in countercurrent with the preheated tail gas. The burner gases may be cooled to about 315° F. and it will be found that there is enough residual heat in the burner gas to raise the temperature of the tail gases up from about 250° F. to 450° F. or higher.

It is recognized that the temperature of the heat transfer surfaces in a device of this kind lies between the temperature of the tail gas on one side and the burner gas on the other and is a function of the heat transfer coefficients on the two sides. If these coefficients are equal the temperature of the heat transfer surface lies midway between the temperatures of the gases on the two sides. The relative heat transfer coefficients can within practical limits be made larger or smaller by the design of the gas passages on either side and by the extent of the surface, all as is well known to designers of this type of equipment. With equal heat transfer coefficients it is possible for the tail gas to be introduced at as low as 194° F. and the burner gases removed at 262° F. before the dew point is reached at the metal surface. However, if the tail gas is introduced at a lower temperature, say at 176° or lower, this will require the burner gas to be cooled below 228° F. in order to maintain the tail gas temperature of 244° F. In such case it is impossible to avoid reaching the dew point at the metal. For this reason we find it is of the utmost importance that the tail gas shall have been preheated before entering this final tail gas heater and the temperature of the tail gas entering this heater should be at least 185° F. and as stated, we prefer to have it as high as about 250° F. The tail gas heater 14 is preferably made of austenitic stainless steel to provide against corrosion during plant shut-down.

Maintaining the burner gas temperature above the dew point during the heating of the tail gas is one of the important features of our invention as this makes it possible to operate with such usual metals as stainless steel without undue corrosion taking place. Unless the compression of the air is adiabatic there will not be enough heat available for preheating the tail gases sufficiently so that this desired effect is produced.

While we have shown the burner, superheater, boiler and tail gas heater as being separate units it is to be understood that in actual construction these units are connected directly together so that the gases will flow directly from one to the other without loss of heat between them. Substantially they will make one unit with differently arranged tubing and connections at different zones within the unit.

The burner gases leaving the preheater 14 will have a temperature in excess of 300° F. and this temperature may be somewhat increased by further oxidation of the NO in the burner gases to $NO_2$. We have already pointed out that one of the dangerous phases in our process is handling of the gases at the dew point, which will occur as the gases are dropped from a temperature of more than 300° F. down to preferably below 200° F. We accomplish this cooling very rapidly and efficiently by passing the burner gases with their residual heat through an economizer 15 in countercurrent indirect heat exchange with feed water for the boiler 11. This water may for example enter the economizer at a temperature of about 85° F. and may be heated up to a temperature approaching 300° F. depending upon the temperature of the burner gases entering the economizer. By having liquid water as the medium on the cool side of the heat transfer surfaces, highly efficient heat transfer coefficients are obtained so that the burner gases may be rapidly cooled from a temperature ranging upward from 300° F. to an exit temperature as low as 100° F. The size of the surfaces required to transfer the heat should be kept at a minimum and the economizer can economically be made of a metal resistant to corrosion such as titanium or special high chromium stainless steel. At the same time by using this residual heat of burner gases for preheating boiler water a maximum efficiency is obtained.

In order to drive the steam turbine 12 and provide the major part of the power required to drive the air compressor 2 calls for substantially the maximum amount of steam that can be produced and superheated by the burner gases on the way to the necessary exit boiler temperature. This steam requirement in turn calls for 10,700 lbs. per hour of boiler feed water at a 100% condensate return, and this amount of boiler feed water has a capacity to absorb about 2,260,000 B.t.u. per hour while passing through the economizer. This heat capacity of the boiler feed water makes the maximum use possible of the low temperature heat remaining available in the sensible heat of the burner gases together with the heat of condensation of the water vapor in these gases as they drop below the condensation temperature. It will thus be seen that we utilize not only the adiabatic heat resulting from the compression of the air but make the most thorough possible utilization of the heat resulting from the burning of the ammonia while minimizing the possibility of damage by the condensation from the burner gases and the resultant formation of liquid nitric acid in the boiler or tail gas heater.

From the economizer 15 the burner gases pass to a water cooled condenser 16 which is equipped with heat transfer surfaces made of 18/8 austenitic stainless steel. This metal can safely be used in the condenser in this system for the gases and condensate have already been cooled in the economizer and therefore the metal walls of the condenser can be held below 170° F. at which temperature corrosion of the austenitic steel is negligible.

It is understood that the burner gases from the condenser 16 will pass through a conventional NO oxidation space with cooling and into the $NO_2$ absorption system contained in the unit 17. The weak acid from the condenser is also sent to the absorption system as indicated in the drawing. As is customary the condensate is fed into the top of the absorption system and flows down by gravity in the usual manner through a number of stages wherein it is brought into contact with the rising current of burner gases containing $NO_2$ and $N_2O_4$, becoming more concentrated in $HNO_3$ as it progresses downwardly. Nitric acid of desired strength of 57% to 60% $HNO_3$ at the bottom of the absorption system is brought into contact with warm secondary air from the second tail gas preheater 5 for the purpose of bleaching or removal of dissolved $NO_2$ and $HNO_2$. The bleached acid is drawn from the absorption system as the desired product.

As previously explained the tail gas from the absorption system is then passed back through the preheaters 3 and 5 where it is preheated to about 250° F. by heat exchange with the hot air from the compressors carrying the heat of the adiabatic compression. These tail gases are then heated to about 450° F. in the tail gas heater 14, and then passed to the moderate temperature gas expansion turbine 18 and out to the stack.

The tail gas enters the gas turbine 18 at about 445° F. and allowing for the necessary pressure drop between air compressor and gas turbine, this will have a pressure of about 95 p.s.i.a. The tail gas expands from 95 p.s.i.a. to about 15 p.s.i.a. in the gas turbine. With about 70% efficiency the temperature of the tail gas will reach about 177° F. in the turbine exhaust and 850 hp. of shaft power is developed.

Maintaining this temperature in the turbine exhaust is important for the tail gas coming from the absorption system contains small amounts of water vapor as well as small residual amounts of NO, $NO_2$ and $O_2$. The dew point of this gas is about 86° F. at 95 p.s.i.a. and well below 86° F. at 14.7 p.s.i.a. (normal atmospheric pressure). This means that during the operation of the tail gas turbine this gas is everywhere well above the dew point. As a consequence of this and of the relatively low temperature of the gas at the inlet, this gas turbine could be entirely constructed of carbon steel were it not for corrosion by small amounts of acid forming nitrogen oxides which condense during shut-down when the machine is cool. To avoid this corrosion the gas turbine 18 is made of 18/8 austenitic stainless steel but it will be noted that it is not necessary to build the rotor blades of special high temperature resistant alloy as must be done in the case of a high temperature gas turbine. At the same time the thermal expansion problems are greatly reduced over those that arise in a high temperature gas turbine. The gas turbine 18 is connected to the air compressor 2 and supplies part of the power required to drive the air compressor.

The air compressor described above operating at 75% adiabatic efficiency in each of its two stages requires about 2110 hp. of which, in the system described, 650 hp. is used to drive the first stage and 1460 hp. to drive the second stage. Thus 1260 hp. is required beyond the 850 hp. supplied by the gas turbine 18.

When all the 10,700 lbs. per hour of steam leaving the superheater 10 is admitted at 400 p.s.i.a. at 750° F. and is expanded to condenser pressure of 2" of mercury in the condenser 19 the steam turbine 12 operating at 70% adiabatic efficiency is capable of developing 1330 hp. which is more than needed to drive the air compressor in conjunction with the gas turbine. This means that we have a small margin over and above the minimum requirements and this may be increased even more by the heat resulting from the oxidation of NO to $NO_2$ which may slightly raise the heat obtained from the burner gas. Actually only about 10,100 lbs. per hour of steam will be used to drive the steam turbine 12 and the rest can be drawn off through the steam pressure controller 13 and used elsewhere.

The quantity of air delivered by the air compressor 2 will be controlled by controlling the speed of the steam turbine through control of the amount of steam admitted to it. It is understood that the steam from the steam turbine 12 passes to the steam condenser 19 which is held at 2" of mercury pressure by cooling water and conventional vacuum equipment. The condensate with any make up water needed is returned to the economizer 15 where it is preheated for use in the boiler 11 as has already been explained.

In the foregoing description we have illustrated our invention in connection with a compressor where an appreciably higher power consumption takes place in the second stage of the compressor as compared to the first stage. This is the more desirable way of operating our process, but because of available equipment and the like it may at times be necessary to operate with a compressor having substantially equal power consumption in each of the two adiabatic stages. Actually in this case the power required for air compression is reduced somewhat and may be a little over 2,000 hp. for an operation of the same size as that previously discussed.

Figure 2:
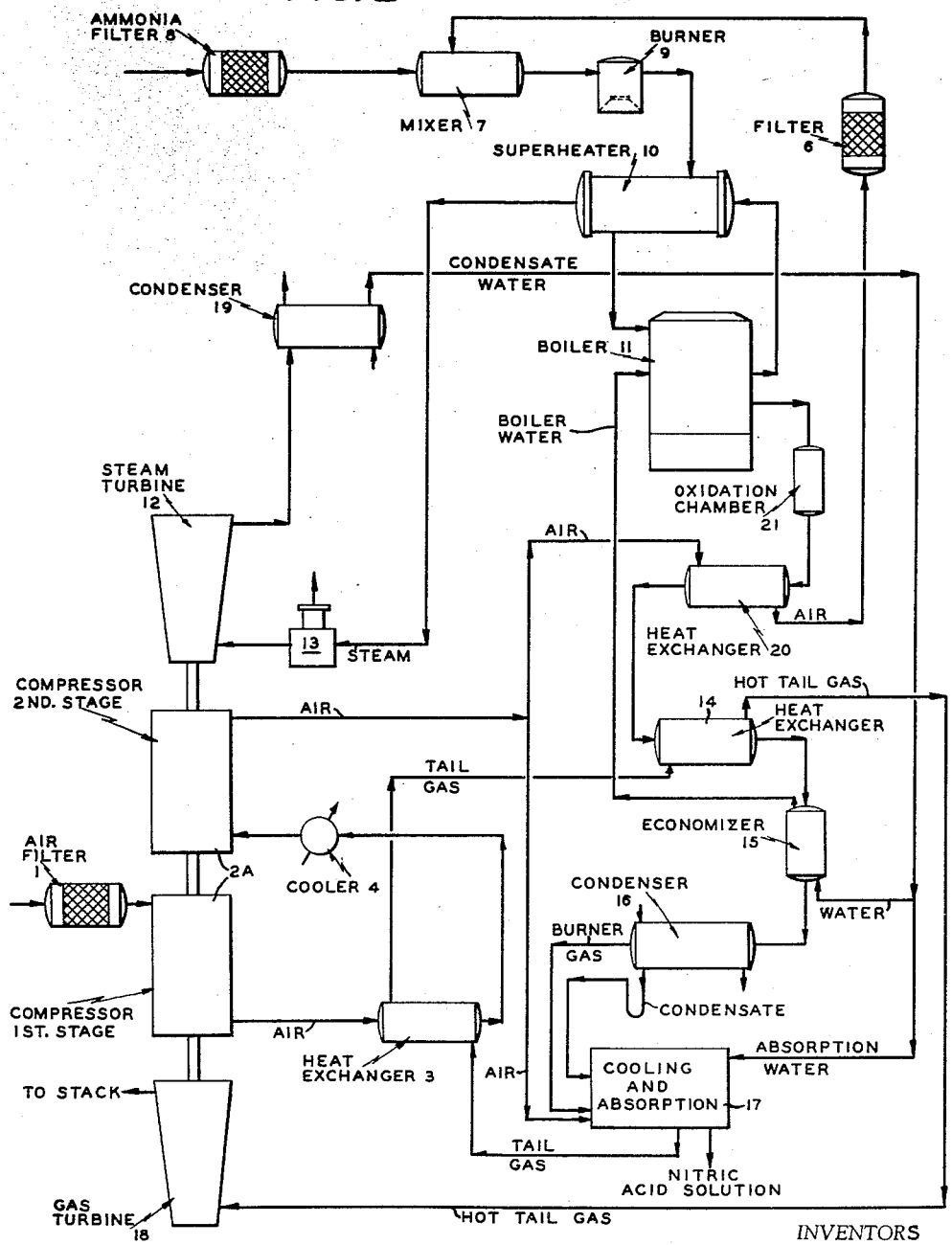
Fig. 2 shows a modification.

The drawback to this type of compression is that the air issuing from the second stage at, for example, 117 p.s.i.a. will have a temperature of only about 340° F. This is not considered high enough for admixture with the ammonia and additional preheating of this air is necessary. An arrangement for doing this is shown in Fig. 2 and it is understood that where the same numerals are used in Fig. 2 as in Fig. 1 the parts serve the same function and these functions will not be explained in detail.

The compressor 2A is a two-stage compressor with approximately equal power consumption in each stage. The air from the first stage of the compressor will have a temperature of about 340° F. and this may be used to heat the tail gas to temperatures something over 300° F. in exchanger 3. In this case the second tail gas preheater is omitted and the gas passes directly from the heat exchanger 3 to the tail gas heater 14. With the tail gas preheated to a temperature of 300° F. or slightly higher, the burner gas will be cooled to only about 360° F. as it comes from the tail gas heater while the tail gas will be heated to about 445° F. With the burner gas entering the economizer 15 at 360° F. the boiler feed water will be heated to about 340° F. whereas in the other system it was heated only to about 300° F. With the feed water at this temperature it is not necessary to withdraw as much heat from the burner gases in the boiler 11 and this boiler may be so constructed that the burner gas coming from the boiler 11 will have a temperature of 600° F. Even with this relatively high temperature for the exit gases, it is possible to generate 10,000 lbs. of steam per hour which can be raised in the boiler to a pressure of about 405 p.s.i.a. and heated in the superheater to about 755° F. This will produce something over 1250 hp. at the shaft of the steam turbine whereas actually only about 1200 hp. is required.

The air from the second stage of the compressor 2A will pass as before through the filter 6 and then into the primary air heater 20 which is interposed at a convenient point in the path of the burner gas, preferably after the burner gas leaves the boiler 11. The primary air will be heated in the air preheater 20 to the desired temperature of 455° F. and then will pass to the ammonia air mixer 7.

In view of the fact that the burner gas leaving the boiler 11 is hotter than in the first example, it will contain sufficient heat units both to heat up the air in the air preheater 20 and to heat the preheated tail gas to the required temperature of about 445° F.

It will be noted that while this second example uses somewhat less power in the air compressor than the first example, it does require an additional piece of equipment in the air preheater 20 which must be of stainless steel not only on the burner gas side but also on the air side in order to prevent rust formation from contaminating the air which is being sent to the burner. This is compensated for somewhat by eliminating the second gas preheater, but we only need stainless steel on the tail gas side of this exchanger and its surface areas will be much smaller than will be required for the air preheater.

Also in the first example no control is needed of the burner gas temperature that comes out from the boiler, for in no case can the burner gases coming out of the boiler be below the temperature of the boiling water, and even if the gas entering the gas turbine has a somewhat lower temperature than in the other case, this will balance off between the power transmitted to the gas turbine and to the steam turbine.

From the above it will be seen that in our system the principal source of power for driving the air compressors is derived from superheated steam, and the gas turbine driven by heated tail gas may be considered as a supplement. The use of a steam turbine greatly simplifies the start-up problem for steam from any desired source as, for example, a separate boiler, can be passed into the turbine 12. By operating this at an overload it can be used for start-up purposes without the necessity of supplying an independent prime mover.

It is understood that the examples shown are given only by way of illustration and may be modified in many particulars.

We claim:

1. In a high pressure nitric acid system in which heat concentrated by the compression of air in the air compressor is recovered and conserved as energy for operating such a compressor the combination of a multi-stage air compressor of the adiabatic type in which virtually all the heat from compression is retained in the air as it emerges from the compressor and which is adapted to deliver air into the system at a pressure of at least 85 p.s.i.a., means for mixing air heated in the final stage of the compressor with ammonia and for burning such mixture in the presence of a catalyst, a boiler heated by the hot burner gases to generate steam, and a superheater whereby said burner gases are used to superheat such steam, a steam turbine connected with the compressor adapted to be driven by said superheated steam, a tail gas heat exchanger for transferring heat from air from a first stage of compression to preheat tail gas from the operation, another heat exchanger in which such preheated tail gas is further heated by burner gases that have been used for generating steam as aforesaid but without lowering the temperature of such gases below their dew point, a gas turbine connected with the compressor adapted to be driven by said heated tail gas such gas turbine and the aforesaid steam turbine being adapted to drive said compressor to produce the specified compression when driven only by the gas and steam derived from the process without supplemental heating, a heat exchanger of corrosion resistant metal into which the burner gases that have been used for heating the tail gas enter at a temperature above their dew point and through which they pass in indirect counter flow to water in liquid phase whereby said burner gases are rapidly cooled below the dew point of contained water vapor and the liquid water in the exchanger is heated for use as feed water for said boiler, and a condenser, for the burner gases, and a cooling and $NO_2$ absorption system from which nitric acid may be withdrawn and from which spent tail gases may be withdrawn to be passed to the tail gas heat exchanger aforesaid and a connection between said condenser and said cooling and absorption system comprising space for NO oxidation.

2. An apparatus as specified in claim 1, in which the air compressor is so designed that the air leaving the last stage is under a pressure of between 85 and 130 p.s.i.a.

3. An apparatus as specified in claim 1, in which the compression in the last stage of the air compressor is sufficient to heat the air discharged from such stage from substantially ambient temperature to a temperature within the range of 430° F. to 490° F.

4. An apparatus as specified in claim 1, in which the said burner, boiler, superheater and tail gas heater are all contained in a single piece of apparatus so that the burner gases pass directly from one to the other without substantial heat loss.

5. The method of operating a high pressure nitric acid system in which heat concentrated by the compression of air in the air compressor is recovered and conserved as energy for operating such a compressor which comprises compressing air to a pressure of at least 85 p.s.i.a. in a multi-stage compressor of the adiabatic type so that virtually all the heat of compression is retained in the air as it emerges from the compressor, mixing air from the final stage of compression with ammonia and burning such mixture in the presence of a catalyst, utilizing the hot burner gases for generating and superheating steam, passing such steam to a steam turbine connected with the compressor, passing hot air from the first stage of compression to a heat exchanger to preheat tail gases from the system and then passing such tail gases to a heat exchanger in which such tail gases are further heated by burner gases that have been used for generating steam as aforesaid but without lowering the temperature of such burner gases below their dew point, passing such tail gases to a gas turbine connected with the compressor, passing the burner gases that have been utilized for heating said tail gases and still at a temperature above their dew point into and through a heat exchanger of corrosion resistant metal in indirect counter flow to water in liquid phase whereby said burner gases are rapidly cooled below the dew point of contained water vapor and the liquid water is heated, using such heated water for generating steam as aforesaid whereby such heated tail gases and the steam so generated supply all the power necessary to drive said compressors to produce the compression specified, and passing the cooled burner gases through a usual condenser, NO oxidation space and cooler and an $NO_2$ absorption system, withdrawing nitric acid from said absorption system and passing spent tail gases to the tail gas heat exchanger as previously provided.

6. In the process of operating a high pressure nitric acid plant, the steps of compressing air in a multi-stage adiabatic air compressor to a pressure of at least 85 p.s.i.a., burning ammonia and air compressed by such compressor in the presence of a catalyst, utilizing the hot burner gases to generate and superheat steam, utilizing the superheated steam to generate power for compressing air for the system, utilizing heat from the air compressed in the first stage of compression for preheating tail gas from the system and then further heating such tail gas with residual heat from the burner gases after they have been used to generate and superheat steam as aforesaid and utilizing such heated tail gas to operate a gas turbine for generating power to assist in operating said air compressor whereby heat concentrated during the compression of air is conserved and utilized as energy for compressing additional air.

7. A method as specified in claim 6 in which the burner gases used for heating the tail gas are maintained during such heating at a temperature above the dew point of any contained water vapor at the pressure employed, after which the burner gases are cooled rapidly in indirect countercurrent flow with water, whereby the corrosion effect of hot nitric acid resulting from condensation of water vapor is localized and whereby water is preheated to be used for the generation of steam as aforesaid.

References Cited in the file of this patent

UNITED STATES PATENTS

| | | |
|---|---|---|
| 1,954,317 | Hobler | Apr. 10, 1934 |
| 2,031,215 | Hobler | Feb. 18, 1936 |
| 2,135,733 | Richardson | Nov. 8, 1938 |

OTHER REFERENCES

Norden: "Chem. Eng.," vol. 63, pages 274–277, Jan. 1956.

Strelzoff: "Chem. Eng.," vol. 63, pp. 170–174, May 1956; vol. 65, pages 56, 58, May 5, 1958.